Jan. 26, 1937.  V. O. BLATZ  2,069,128
VALVE FOR PNEUMATIC TIRES FOR MOTOR DRIVEN VEHICLES GIVING ACOUSTIC SIGNALS
Filed June 8, 1933
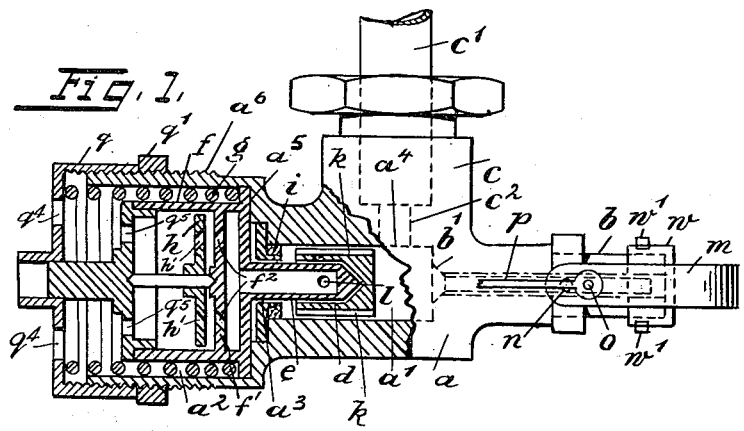
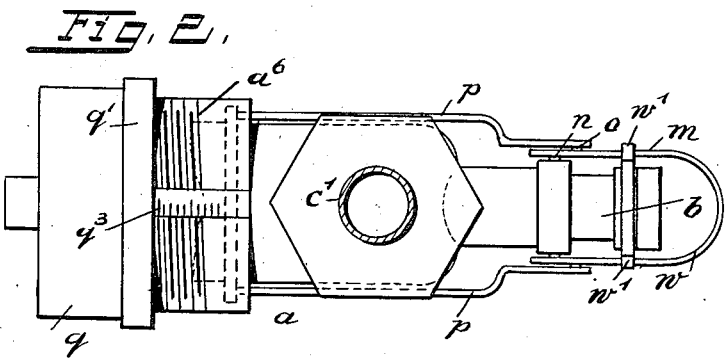
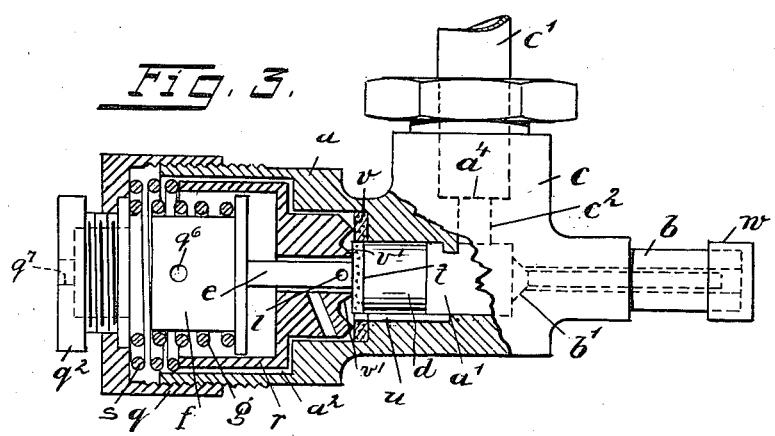
Inventor
Valentin Otto Blatz Patented Jan. 26, 1937

2,069,128

UNITED STATES PATENT OFFICE 2,069,128

VALVE FOR PNEUMATIC TIRES FOR MOTOR DRIVEN VEHICLES GIVING ACOUSTIC SIGNALS

Valentin Otto Blatz, Munich, Germany

Application June 8, 1933, Serial No. 674,838
In Germany June 9, 1932

3 Claims. (Cl. 116—34)

This invention relates to a valve in a pneumatic tire for motor driven vehicles which is connected to the socket of the pneumatic tire and adapted to produce an acoustic signal either when the pressure in the tire sinks below its normal value or when this pressure rises above its normal value.

The object of the invention is to produce a valve for pneumatic tires producing acoustic signals and consisting only of a few parts easy to produce and which comprises a mounting of the signal giving device sufficiently protected against shocks and soiling.

Two embodiments of the invention are illustrated by way of example in the accompanying drawing in which:

Fig. 1 shows in longitudinal section and partly in elevation a form of construction of a valve functioning only if the pressure sinks below the normal pressure.

Fig. 2 is a top plan view of Fig. 1.

Fig. 3 shows in longitudinal section a second form of construction according to which the valve functions also if the pressure rises above the normal pressure.

In accordance with Figs. 1 and 2 the valve for producing an acoustic signal comprises a valve casing, the longitudinal axis of which is at right angles to the longitudinal axis of the socket $c^1$ of the pneumatic tire and said casing is adapted to be mounted on this socket $c^1$ by means of a branch socket $c$. The valve casing has a pump connection $b$ situated in the direction of the longitudinal axis of the valve casing and containing a check valve $b^1$ through the intermediary of which the inflating of the pneumatic air tire takes place. Behind the seat of the check valve $b^1$ two channel-like widenings $a^1$ and $a^2$ are arranged the one behind the other in the valve casing $a$ and connected the one with the other by a channel $a^3$. A piston $d$ moves loosely in the widening $a^1$ from which branches at $a^4$ the air channel $c^2$ leading to the tire socket $c^1$. A tubular extension socket $e$ of a piston like casing $f$ bears from behind against the piston $d$, this casing being mounted in the widening $a^2$ so that it can be shifted in axial direction and it is pressed against the end wall $a^5$ by the action of a spiral spring $g$ which at the rear end bears against a closing cap $q$ adapted to be screwed on. Through the channel $a^3$ extends the extension socket $e$ which fits loosely in the bore of the piston $d$ and, if the casing $f$ is shifted in axial direction, moves in this channel. In the casing $f$ a siren $h$ of known construction is mounted as a signal giving device. A packing $i$ is arranged around the channel $a^3$, against which packing the piston $d$ is pressed by the normal pressure in the pneumatic tire to which the socket $c^1$ belongs. The piston $d$ is air-tightly pressed against the packing in pushing back the casing $f$.

If the normal pressure sinks, the piston $d$ is pushed away from the packing $i$ into the position shown in Fig. 1 by the action of the spring $g$ while this spring pushes the casing $f$ up to the end wall $a^5$. In this position of the piston $d$ and of the casing $f$ shown in Fig. 1 air can flow from the pneumatic air tube through the socket $c^1$, the air channel $c^2$, past the piston $d$ and into the extension socket $e$ and into the casing $f$ and operate in the same the siren or similar signalling device so that a signal is given. In the example illustrated in Fig. 1, the casing $f$ has an intermediate wall $f^1$ with inclined openings $f^2$ through which the air escaping from the tire through the socket $e$ passes and impinges upon the rotor or actual siren $h$ and the siren has also inclined holes $h^1$ through which the escaping air passes. Thus by the air impinging on the siren and passing through the holes therein, the siren will be caused to rotate producing a signal sound.

In order that the air which is over the piston $d$ and the extension socket $e$ can flow into the casing $f$, the piston has in its circumference longitudinal notches $k$ or flutes and the extension socket has an air inlet aperture $l$. The air escapes through passages $q^5$ and $q^4$.

The adapting of the valve to the actually desired normal pressure is effected in that the closing cap $q$, which forms the rear support for the spring $g$, is screwed more or less far over the screw thread $a^6$ of the casing $a$. If necessary, the adapting to a predetermined normal pressure can be facilitated by an abutment ring $q^1$ which is adapted to be adjusted to different pressures with the aid of the scale $q^3$.

For inflating the pneumatic tube to which the socket $c^1$ belongs, the casing $f$ must be pushed back by hand in opposition to the action of the spring $g$. With this object in view a hand bow $m$ is hingedly connected at $n$ to the pump socket $b$, two arms $p$ being eccentrically hinged at $o$ to this bow $m$ and bearing in rearward direction against the siren casing. If the bow $m$ is folded backwards from the position shown, it pushes through the intermediary of the arms $p$ the casing $f$ away from the end wall $a^5$ so that the piston $d$ can come into contact with the packing $i$ under the action of the pressure of the air which is pumped into the pneumatic tube. After the inflating, the bow $m$ is again folded over in a forward direction.

The hand bow $m$ with the arms $p$ may also be used to prevent a further escaping of air through the siren if the drop below the normal pressure, which has been indicated by the signal, cannot be remedied promptly. In this case the bow $m$, which has been folded back for pushing back the casing $f$, remains in the lifted position.

In order that after the inflating it be not forgotten to turn the bow $m$ into its normal position, the commonly used closing cap $w$ of the pump socket $b$ can be slidably mounted at $w^1$ on the longitudinal arms of the bow $m$.

In the valve shown in Fig. 3 the casing $f$ with the siren $h$ and the extension socket $e$ serving again as air channel is loaded by the spring $g$ and axially shiftable in a piston $r$ which in turn is mounted in the valve casing $a$ and is shiftable in axial direction and acted upon by a spiral spring $s$. This spiral spring can be adjusted by the cap $q$, whereas the adjusting of the spring $g$ is effected by a screw insert $q^2$ of the cap $q$. The pressure of the spiral spring $s$ is selected higher than the pressure of the spring $g$. The piston $r$ is air-tightly pressed by the spring $s$ against the ring packing $v$ which surrounds the rear mouth of the widening $a^1$. The piston $d$ is in this form of construction fitted on its rear end face with a disc packing $t$ and pressed with the same under the pressure of the pneumatic tire air-tightly against the extension socket $e$. $u$ is an air channel which in the position of the piston $d$ shown in Fig. 3 is shut off against the siren casing by an inner annular extension $v^1$ of the piston $r$. For this purpose the annular extension $v^1$ bears against the packing disc $t$.

In the form of construction shown in Fig. 3 both the spring $s$ and the spring $g$ are influenced by the movement of the cap $q$, but the adjustment of the spring $g$ is effected by the screw insert $q^2$, whereas the spring $s$ is adjusted to the necessary pressure only by the cap $q$. The fact that the cap $q$ acts at the same time on the spring $g$ is without technical importance.

If the pressure sinks under the normal pressure, the piston $d$ is again pushed back by the spring $g$ through the casing $f$ and the extension socket $e$ and the air communication to the siren $h$ through the channel $u$ is opened since the piston $d$ with its packing disc $t$ is moved away from the annular extension $v^1$ of the piston $r$ so that the path through the channel $u$ to the air inlet aperture $l$ of the extension socket $e$ becomes free. The air then escapes through the passages $q^6$ and $q^7$.

If the pressure rises above the normal pressure, the piston $r$ is slightly pushed back by the piston $d$ and thereby the air communication to the siren $h$ is established through the channel $u$. In this instance this is effected by the piston $r$ being moved away from the packing $v$.

I claim:—

1. Means for producing acoustic signals, comprising in combination with a pneumatic air tube and a socket on this tube, a valve casing mounted at right angles to said tube socket connected thereto, a pump socket on said valve casing, a check valve in said pump socket, a spring controlled siren casing mounted in said valve casing shiftable in axial direction, a piston mounted in said valve casing shiftable in axial direction, and a ring packing against which said piston is pressed in the shutting off position by the pressure of the compressed air, and a spring controlling said piston adapted to push said piston away from said ring packing through the intermediary of said siren casing as soon as the air pressure sinks below the normal pressure.

2. Means for producing acoustic signals, comprising in combination with a pneumatic tube and a socket on this tube, a valve casing mounted at right angles to said tube socket and connected thereto, a piston loosely mounted in said valve casing exposed to the action of the pressure existing in the pneumatic tube, a spring controlled piston behind said loosely mounted piston, a spring controlled siren casing axially shiftable in said spring controlled piston, an extension socket on said siren casing serving as air channel leading thereto and bearing against said loosely mounted piston and a ring packing positioned to be engaged by said spring controlled piston to control the flow of air through said extension socket.

3. Means for producing acoustic signals, comprising in combination with a pneumatic air tube and a socket on this tube, a valve casing with a pump socket and a check valve mounted at right angles on said tube socket, a loosely mounted axially shiftable piston having flutes in its circumference serving as air channels, a ring packing against which said piston is pressed in its shutting off position by the action of the compressed air from the air tube and a spring controlled siren casing axially shiftable in said valve casing and bearing against said piston, said siren casing adapted, when the air pressure in the air tube drops, to shift said piston away from said packing ring and allow the air to escape from said tube through said air channels.

VALENTIN OTTO BLATZ.